Dec. 31, 1929.     L. C. RAU     1,741,880
DISPLAY DEVICE
Filed May 4, 1928     2 Sheets-Sheet 1
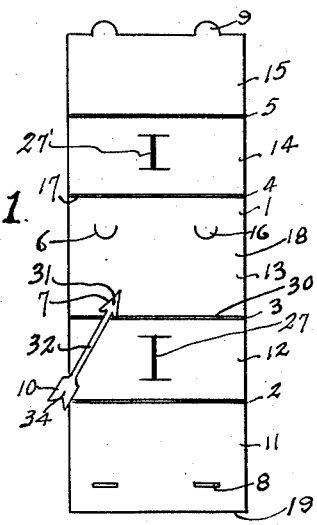
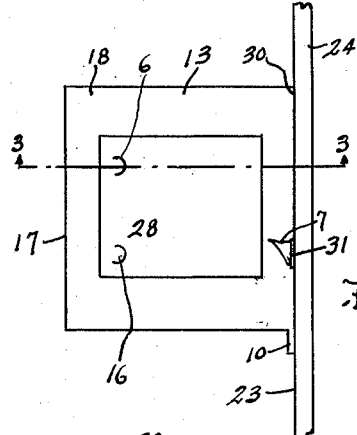
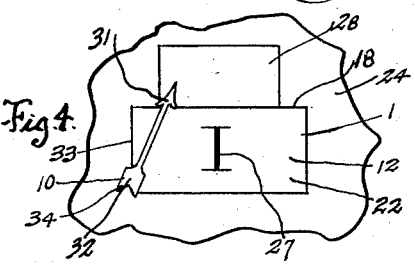
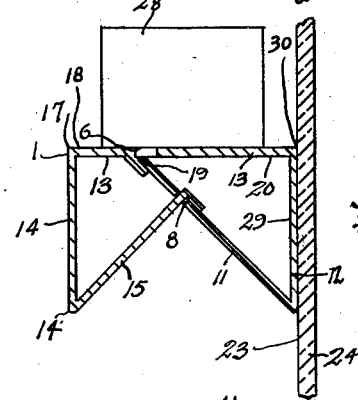
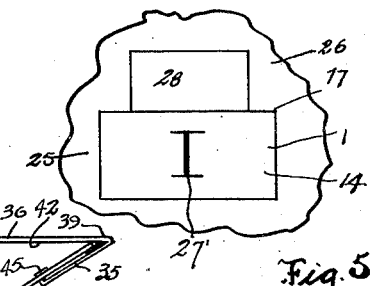
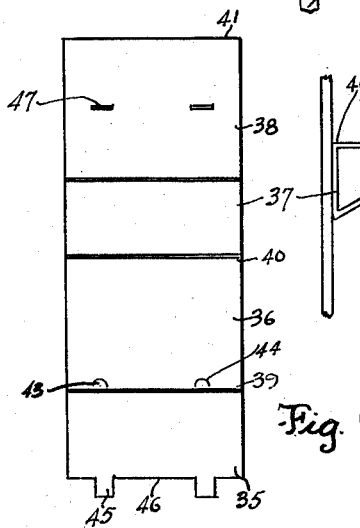
Inventor
LESTER C. RAU
By Leo P. Parker
Attorney Dec. 31, 1929. L. C. RAU 1,741,880
DISPLAY DEVICE
Filed May 4, 1928 2 Sheets-Sheet 2
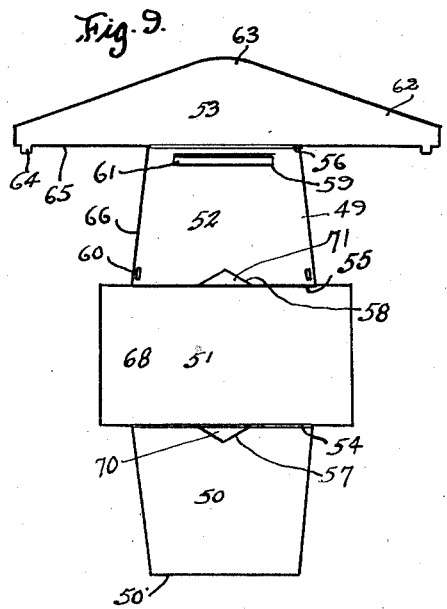
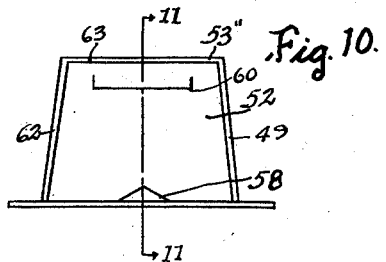
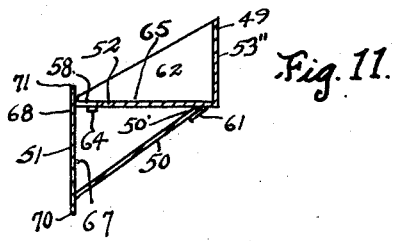
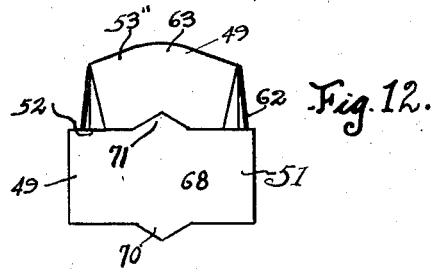
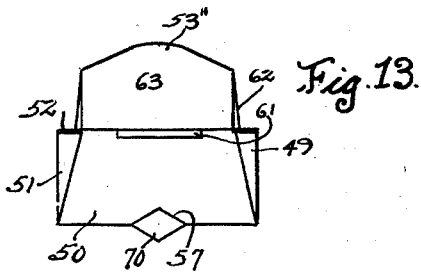
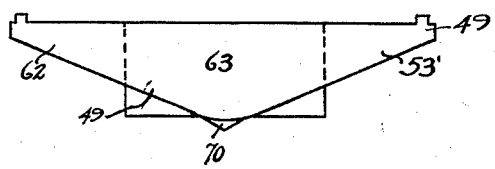
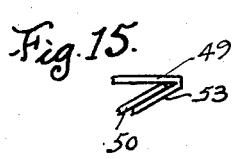
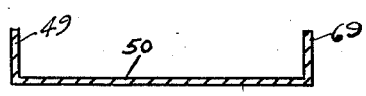
Inventor
Lester C. Rau
By
Attorney Patented Dec. 31, 1929

1,741,880

UNITED STATES PATENT OFFICE

LESTER C. RAU, OF CINCINNATI, OHIO

DISPLAY DEVICE

Application filed May 4, 1928. Serial No. 275,221.

The invention relates to display devices adapted to be attached to any vertical support.

The objects of the invention are to provide a simple, effective, economical, and durable display device adapted to be attached to any vertical support, particularly window glasses and mirrors, for displaying and advertising saleable merchandise or other commodity; to provide a device of this character formed from paper or other suitable fibrous sheet material and so constructed that said device may be packed and shipped in sheet formation and afterward manually bent conveniently for the purpose of forming a display device having a front for attachment to a vertical support, a shelf for supporting the article to be displayed, and efficient means for supporting said shelf; to provide a display device having suitable space for imprinting advertisement at the front and rear thereof; and to provide convertable means adapted to be used as an apron to conceal the rear of the front of said device, or to form side-boards for said shelf.

The invention consists in the combination and arrangement of the parts, and in the details of the constructions, as claimed.

In the drawings:

Fig. 1 is a plan view showing the invention in flat or unfolded formation;

Fig. 2 is a plan view showing the invention attached to a window glass partly broken away;

Fig. 3 is a section taken on a line corresponding to 3—3 in Fig. 2;

Fig. 4 is a front elevation showing the invention attached to a window glass partly broken away;

Fig. 5 is a rear elevation showing the invention attached to a mirror partly broken away;

Fig. 6 is a plan view of a modified form of the invention in flat or unfolded formation;

Fig. 7 is a side elevation of the same shown attached to a window glass;

Fig. 8 is a side elevation of the same showing the apron supporting the brace;

Fig. 9 is a plan view showing another modified form of the invention in flat or unfolded formation;

Fig. 10 is a plan view of the same in folded position, and showing the apron used for sideboards of the shelf;

Fig. 11 is a section taken on line 11—11 in Fig. 10;

Fig. 12 is a front elevation of the same;

Fig. 13 is a rear elevation of the same;

Fig. 14 is a rear elevation showing the invention in folded position with the apron suspended downwardly;

Fig. 15 is a side elevation showing the apron used as a brace for the support, with parts broken away; and Fig. 16 is a transverse section of a modified form of the support shown in Figs. 9 to 15 inclusive.

In one form of the invention, shown in Figs. 1 to 5, inclusive, I provide the display device 1 formed from paper or other suitable fibrous and flexible sheet material.

In Fig. 1 is shown the device 1 in unfolded or flat position formed from sheet material by means of a suitable cutting die. Simultaneously with the operation, by which the device is cut from a sheet, the spaced apart and parallel grooves or scores 2, 3, 4, and 5 are impressed, the semi-circular cuts 6, the arrow head shaped cut 7 and the slots 8 are made, and the ears 9 and the projection 10 are formed in the device, for purposes hereinafter fully explained.

The device 1 consists of the integrally formed support 11, front 12, shelf 13, apron 14, and brace 15. The grooves 2, 3, 4, and 5, respectively, are intermediate the support 11 and the front 12, the front 12 and the shelf 13, the shelf 13 and the apron 14, and the apron 14 and the brace 15 for the purpose of permitting the device to be conveniently bent from the flat formation shown in Fig. 1 to the formed display device, shown in Figs. 2 to 5, inclusive, by the manual operations as follows:

First, the spaced apart flaps 16, formed by the cuts 6 adjacent to the outer edge 17 of the horizontal shelf 13, are bent downwardly from the top 18 of the shelf; then the shelf 13 is bent rearwardly of the front 12, along the groove 3, and at right angles to the front; then the support 11 is bent, along the groove 2, upwardly and rearwardly of the front 12, and its upper edge 19 is positioned intermediate the flaps 16 and the lower surface 20 of the shelf 13, then the apron 14 is bent, along the groove 4, downwardly and substantially at right angles to the shelf; and then the brace 15 is bent, along the groove 5, upwardly and forwardly of the front 12 and the ears 9 are inserted in the slots 8 and bent in contact with the support 11, as shown in Fig. 3.

Suitable adhesive is affixed to the front surface 22 of the front 12, adjacent its top 18, whereby the display device may be firmly attached to the inner surface 23 of the window glass 24, as shown in Figs. 2, 3, and 4, or to the outer surface 25 of the mirror 26, as shown in Fig. 5.

Suitable reading matter or characters 27 and 27′, respectively, such as advertisements, notifications, or descriptions of the article of merchandise, container or other article 28, being displayed and supported by the shelf 13, may be printed upon the outer surfaces of the front 12 and the apron 14, whereby when the display device is attached to a window glass the reading matter is readily discernible by observers who view the device from its front or its rear. When the device is attached to a non-transparent support, such as a mirror in a retail establishment, the printed matter or character 27′ upon the apron 14 is readable. Moreover, when the device is viewed from its rear the apron conceals the inner surface 29 of the front.

If desirable, suitable transparent adhesive may be affixed to the complete outer surface of the front 12, whereby the device is more securely attached to a support and the character 27′ may be viewed through a window glass or other transparent support.

The cut 7 adjacent the front edge 30, of the shelf 13, forms the arrow head 31 of the indicator 32 which is printed upon the outer surface of the flat formation shown in Fig. 1, whereby when the device is bent in the form shown in Figs. 2, 3, 4, and 5, the arrow head 31 extends upwardly parallel with the front 12 indicating to observers the position of the article 28. The projection 10 of the edge 33 of the front 12 forms a portion of the rear end 34 of the indicator.

Glue or other stiffening means may be painted on the edge 17 of the shelf 13, after the device is formed, to maintain the apron 14 at right angles to the shelf 13. Also, glue may be applied at the adjoining edges of the apron and the brace 15. The shelf, and any article or weight 28 thereon, is sustained by the support 11 which transfers the force of this weight to the front 12 which in turn imparts this force to the glass 12, or other verticle support to which the front is attached. The natural tendency of the support 11 is to bend downwardly, when supporting the article 28, but since the brace 15 is connected with the support, intermediate its edges, and extends downwardly at right angles thereto, and is connected with the lower edge 14′ of the apron 14, the support 11 is braced against bending downwardly.

In Figs. 6, 7, and 8, is shown a modification of the invention comprising the apron 35, the shelf 36, the front 37, and the support 38. The apron and front, respectively, are integrally formed with the rear edge 39 and the front edge 40 of the shelf 13, and are manually bent downwardly and at right angles to the shelf from the flat formation shown in Fig. 6 to the form shown in Fig. 8, after which the support 38 is bent upwardly and rearwardly with its rear edge 41 intermediate the lower surface 42, of the shelf, and the flaps 43 which are formed by the cuts 44. Suitable advertisements may be printed upon the outer surfaces of the front 37 and the apron 35.

When for any reason it is desirable to reinforce the support 38, the apron 35 may be bent upwardly and inwardly from the position shown in Fig. 8 to the position shown in Fig. 7, and the ears 45, integral with the lower edge 46 of the apron are inserted into the slots 47 in the support, and then bent in contact with the inner surface 48 of the support, whereby when the shelf 36 supports a relatively heavy article 49 the support 38 is reinforced against bending.

Since the device shown in Figs. 1 to 5 and 9 to 15 is intended for display purposes the arrow 32 is advantageous and effective in attracting the attention of persons to the article being displayed, after which the advertisement or notification, illustrated by character 27, may be read by the observers whereby they are informed of the quality, price, and other advantages of the product being displayed and are therefore likely to be induced to purchase the same.

In Figs. 9 to 15, inclusive, I show another modification and the preferred construction of the invention comprising the display device 49, consisting of the integrally formed support 50, the front 51, the shelf 52, and the T-shaped member 53 which is convertible into the apron 53′ or the sideboards 53″.

Simultaneously with the operation by which the device 49 is cut from a sheet, the spaced apart grooves or scores 54, 55, 56, respectively, are made intermediate the support 50 and the front 51, the front 51 and the shelf 52, and the shelf 52 and the apron 53, to facilitate in bending the device from the flat formation shown in Fig. 9, to the folded device shown in Figs. 10 to 15, inclusive. Also, simultaneously with the cutting operation the cuts 57, 58, 59, and 60 are made in the device for purposes hereinafter fully explained.

In forming the device the manual operations are as follows:

First, the flap 61 is bent downwardly; then the front 51 is bent downwardly at right angles to the shelf 52, then the support 50 is bent upwardly with its edge 50' supported by the flap 61; then (to make the form of the device shown in Figs. 10 to 15, inclusive) the apron 53' is bent upwardly at right angles to the shelf 52; and then the ends 62 of the apron are bent forwardly at right angles to the body 63 and the ears 64 (integral with the lower edge 65 of the ends 62 of the member 53'), are inserted into the cuts 60 adjacent the edge 66 of the shelf 51 whereby such commodities as beans, sugar, flour, and the like merchandise, are prevented from falling off the shelf by the side boards 53'', thus formed by means of the member 53.

If, however, the use of the sideboards 53'' are undesirable, the apron 53' may be bent downwardly at right angles to the shelf 52, as shown in Fig. 14, whereby the inner surface 67 the front 51 and the support 50 are partly concealed. Suitable notifications or advertisements may be imprinted upon the outer surface 68 of the front, or upon either or both surfaces of the member 53. Suitable adhesive may be utilized to affix the front 51 to a suitable vertical support, as a window glass or mirror.

In Fig. 15 is shown the member 53 used as a brace for the support 50, as by bending the member rearwardly from the position shown in Fig. 14 and suitably securing it to the support.

In Fig. 16 is shown a transverse section of a modified form of the support 50 having the inetgral sides 69 bent at right angles thereto, whereby the support is braced against bending longitudinally.

The indicators 70 and 71, made by the cuts 58 and 57, are formed when the device is bent in formed position. These indicators may be of any shape, and are adapted to indicate to observers the location on any article that may be supported by the shelf 52.

An advantage of the various forms of the invention is that it is economical to manufacture and being in sheet formation a plurality of the devices can be packed and shipped compactly in a relatively small space, thus conserving the cubical area of the cartons or other containers in which the devices are packed for shipment or storage, whereby the transportation and storage costs are reduced to a minimum.

It is, therefore, apparent that I have invented a highly desirable device of the character described and for the purposes intended which is readily adaptable for use in displaying various articles in windows and other attractive locations.

It is, of course, understood that the display devices may be made of any size, and constructed of any materials deemed convenient and suitable for a device of this character, and while I have illustrated and described the forms of construction, and arrangements of the elements which I have found desirable in materializing the invention, I wish to emphasize the fact that I desire to include in this application all equivalents and substitutes that may fairly be considered to come within the scope and purview of my invention as defined in the claims.

What I claim as new and desire to secure by Letters Patent is:

1. A display device for windows formed from flexible sheet material and comprising a vertical front adapted to be attached to a vertical support, a horizontal shelf comprising a single layer of sheet material integral with said front, a vertical apron, a support integral with said front and extending upwardly and rearwardly in supporting engagement with said shelf, and means whereby said apron can be utilized to brace said support.

2. A display device formed from sheet material and comprising an upwardly and rearwardly extending support, a vertical front, a horizontal shelf, and a downwardly extending apron, all being formed integral with each other, said front adapted to be attached to a vertical glass, means whereby said support is adapted to support said shelf, means whereby said apron may be converted into side-boards for said shelf, and means whereby said apron is utilized to brace said support.

3. A display device for windows formed from sheet material and comprising a vertical front adapted to be attached to a vertical pane of glass, a horizontal shelf comprising a single layer of sheet material having its front edge integral with the upper edge of said front, a support integral with the lower edge of said front and extending upwardly and rearwardly, a flap integral with the rear edge of said shelf adapted to retain the upper edge of said support in supporting engagement with said shelf, and an apron integrally formed with the outer side and rear edge of said shelf, and means whereby said apron is adapted to brace said support.

LESTER C. RAU.